United States Patent
Jang

(10) Patent No.: US 9,837,883 B2
(45) Date of Patent: Dec. 5, 2017

(54) ELECTRIC MOTOR COMBINED WITH POWER GENERATOR USING COIL PLATE HAVING SEPARATE COIL BODIES AND RECIPROCATING MAGNET PLATE HAVING SEPARATE MAGNETS

(71) Applicant: Sukho Jang, Seoul (KR)

(72) Inventor: Sukho Jang, Seoul (KR)

(*) Notice: Subject to any disclaimer, the term of this patent is extended or adjusted under 35 U.S.C. 154(b) by 247 days.

(21) Appl. No.: 14/778,113

(22) PCT Filed: Mar. 20, 2013

(86) PCT No.: PCT/KR2013/002275
§ 371 (c)(1),
(2) Date: Sep. 18, 2015

(87) PCT Pub. No.: WO2014/148656
PCT Pub. Date: Sep. 25, 2014

(65) Prior Publication Data
US 2016/0164389 A1    Jun. 9, 2016

(30) Foreign Application Priority Data
Mar. 19, 2013 (KR) .................... 10-2013-0029061

(51) Int. Cl.
*H02K 33/00* (2006.01)
*H02K 35/00* (2006.01)
(Continued)

(52) U.S. Cl.
CPC ............ *H02K 33/00* (2013.01); *H02K 7/075* (2013.01); *H02K 7/116* (2013.01); *H02K 33/14* (2013.01);
(Continued)

(58) Field of Classification Search
CPC ........ H02K 33/00–33/18; H02K 11/21; H02K 11/215; H02K 12/22; H02K 12/225;
(Continued)

(56) References Cited

U.S. PATENT DOCUMENTS 5,828,195 A * 10/1998 Zalesski ................. H02K 29/06
318/273
6,351,089 B1 * 2/2002 Ibuki ..................... H02P 25/032
310/19
7,218,017 B1 * 5/2007 Chitayat ................ H02K 21/14
310/12.19

FOREIGN PATENT DOCUMENTS

JP   2006-333688 A   12/2006
JP   2011-166894 A    8/2011
(Continued)

*Primary Examiner* — Thomas Truong
(74) *Attorney, Agent, or Firm* — Novick, Kim & Lee, PLLC; Jae Youn Kim

(57) ABSTRACT

Provided is an electric motor combined with a power generator comprising: a fixed coil plate in which separate coil bodies are uniformly arranged; and a reciprocating magnet plate in which separate magnets are uniformly arranged. The installation location of the electric motor combined with a power generator is not restricted by linearly or rotationally moving equipment. In addition, the electric motor combined with a power generator enables coils and magnets to be regularly and closely arranged in the coil plate and the magnet plate, thereby minimizing loss of the locomotive force. Furthermore, when performing a reciprocating movement to which an inertial force is added, the electric motor combined with a power generator enables electric current to be instantly broken and converted and supplied by sensing of sensors, while implementing a strong reciprocating movement due to an increase of speed by means of the compression and repulsive force of a spring.

9 Claims, 7 Drawing Sheets

(51) Int. Cl.
*H02K 11/00* (2016.01)
*H02K 35/02* (2006.01)
*H02K 7/075* (2006.01)
*H02K 7/116* (2006.01)
*H02K 33/14* (2006.01)
*H02K 47/00* (2006.01)
*H02K 41/03* (2006.01)

(52) U.S. Cl.
CPC ............ *H02K 35/02* (2013.01); *H02K 47/00* (2013.01); *H02K 41/031* (2013.01)

(58) Field of Classification Search
CPC ...... H02K 12/241; H02K 35/00–35/06; H02K 41/00–41/065
USPC ....................... 310/68 B, 15–39, 12.01–12.33
See application file for complete search history.

(56) References Cited

FOREIGN PATENT DOCUMENTS

| KR | 10-2005-0006105 A | 1/2005 |
| KR | 10-2006-0084369 A | 7/2006 |
| KR | 10-2007-0021184 A | 2/2007 |
| KR | 10-0988667 B1 | 10/2010 |
| KR | 10-1025387 B1 | 3/2011 |

\* cited by examiner

ELECTRIC MOTOR COMBINED WITH POWER GENERATOR USING COIL PLATE HAVING SEPARATE COIL BODIES AND RECIPROCATING MAGNET PLATE HAVING SEPARATE MAGNETS

TECHNICAL FIELD

The present invention relates to an electric motor combined with a power generator using a reciprocating plate, and more specifically, to an electric motor combined with a power generator using a coil plate having separate coil bodies and a reciprocating magnet plate having separate magnets which generates a reciprocating locomotive force and an electric power by applying a repulsive force and an inertia force through a rectangular fixed coil plate and rectangular reciprocating magnet plates, so as to be used in linearly or rotationally moving equipment without limitation in a range for installing the same, and provide strong reciprocating movement and instant electric-generating capacities without loss of locomotive force by a reciprocating movement using the inertia force.

BACKGROUND ART

In general, an electric motor is a device for converting an electric energy into a mechanical energy by using a force applied to a current charged conductor in a magnetic field, and is commonly referred to as a motor. The electric motor is classified into a DC motor and an AC motor in accordance with the type of power source. The AC motor is divided again into a three-phase AC motor and a single-phase AC motor, and the three-phase AC motor has been mainly used in recent years.

The electric motor is a device for converting the electric energy into a mechanical work by using a force applied to the current charged conductor in the magnetic field to mostly generate a power of a rotational movement.

Such an electric motor was begun to be made when electromagnetic induction was discovered by Faraday in around 1831. The early electric motor is a system which swings a movable unit to generate a power using attractive force/repulsive force of permanent magnets without rotating. In 1830, the DC motor having the same type as todays was initially made using an armature and electromagnets excited by DC, but it has a low power and is no more than a device in a level of research phase.

Thereafter, with finding a rotating magnetic field occurred in AC by Ferraris and Tesla as a momentum, two-phase AC motors were independently invented by them. After a three-phase AC motor having an output of 100 watts (W) was made in Germany for the first time by Dovrowelski in 1889, the three-phase AC motors are mainly used in recent years.

In addition, both of the DC motor and the AC motor operate by same principle, and when locating the current charged conductor in the magnetic field, an electromagnetic force (Lorentz force) occurs in a direction perpendicular to the direction of the magnetic field. When placing the magnets inside the electric motor to produce the magnetic field, and applying the current to a conductive wire connected to a rotor shaft, an electromagnetic force occurs. At this time, by the Fleming's left-hand rule, the rotor shaft rotates to generate the power. The electromagnetic force acting on the conductive wire is proportional to intensities of the magnetic field and current, and a length of the conductive wire.

Meanwhile, products commercially available from the market around us are industrial equipment developed with a focus on the function of a conventional power motor. However, recently, the power motor does not meet the needs of the times in terms of effective use of the energy, and as a result, there is a limit for applying the power motor to electric bicycles, electric motorcycles, electric cars, and the like. Accordingly, it is also an important problem to overcome such a limitation in application.

Further, in the equipment that requires a strong impelling force (torque), conventional cylinder motors employ a reduction gear for generating the power against the attractive force of the magnets and cores, or a system for satisfying a condition required to obtain a maximum function (load capacity) through a control compatible with voltage and current. However, the cylinder motors have complicated problems that it is difficult to effectively use a supplied electric energy due to a decrease in the inertia force and an overcurrent during starting, and a weight and manufacturing costs of a battery are increased.

For these problems, Korean Patent Registration Nos. 0988667 and 1025387, which have been filed and registered by the present applicant, disclose an electric motor in which coils are separately disposed in a radial shape into respective discs made of a nonmagnetic material, and rotating magnetic discs separately disposed in a radial shape are respectively installed on an upside and a downside of a fixing plate for separate coils at a predetermined interval, thus to provide the repulsive force and the electric-generating capacities, while inducing horizontal cross magnetic forces by a magnetic plate and a coil plate of the rotating disc.

However, the electric motor using the disc has a limitation in application that it should be installed in the equipment for providing the rotational movement, and the like, in terms of configuration. In particular, since the electric motor is formed in a disc shape, when increasing a size of the disc, there are problems that tightness is decreased due to an arrangement of the coils and magnets radially arranged on the circumference according to the structural nature thereof, and a loss of locomotive force occurs, and as a result, causing a decrease in electric-generating capacities and electric-generating speed.

DISCLOSURE

Technical Problem

In consideration of the above-mentioned circumstances, it is an object of the present invention to provide an electric motor combined with a power generator using a coil plate having separate coil bodies and a reciprocating magnet plate having separate magnets which includes the coil plate having the coil bodies uniformly and separately arranged on both surfaces thereof, and the reciprocating magnetic plate having the magnets uniformly arranged at both surfaces thereof facing the coil plate, such that the coil bodies and the magnets may be regularly and closely arranged in the arrangement of the coil plate and the magnet plate, without limitation in a range for installing in linearly or rotationally moving equipment, and thereby it is possible to minimize the loss of the locomotive force.

In addition, another object of the present invention is to provide an electric motor combined with a power generator using a coil plate having separate coil bodies and a reciprocating magnet plate having separate magnets which is capable of providing an enhanced reciprocating movement due to the compression and expansion force of the springs, and thereby improving the electric-generating capacities during reciprocating with an inertia force added thereto, while allowing to instantly cut off the current, and convert and supply current to the coil bodies by the detection of the sensors.

Technical Solution

In order to accomplish the above objects, there is provided an electric motor combined with a power generator using a coil plate having separate coil bodies and a reciprocating magnet plate having separate magnets to provide electric-generating capacities due to repulsive force while inducing a horizontal cross magnetism between the coil plate and the magnet plate, the electric motor including: a vertically opened motor body including rail plates disposed so as to face each other on both sides in a longitudinal direction thereof, and covers which cover both ends of the rail plates and have springs respectively disposed therein;

a fixed plate unit including a coil plate of which both sides are fixed to the rail plates in the motor body, and a plurality of coil bodies are uniformly arranged on an upper surface and a lower surface thereof;

a reciprocating plate unit including upper and lower magnet plates which are slidably mounted in the motor body with being separately positioned on an upside and a downside of the coil plate at a predetermined interval, and have a plurality of upper and lower magnet plates arranged on both surfaces thereof at positions corresponding to the coil plate;

first and second stop detection sensors which are disposed on both sides of at least one rail plate in the motor body, and are configured to detect the reciprocating plate unit when reaching a predetermined position; and first and second start detection sensors which are respectively mounted on an inner surface of the covers in the motor body, and are configured to detect the reciprocating plate unit when reaching a tip position of the rail plate.

Advantageous Effects

According to the electric motor combined with a power generator using a coil plate having separate coil bodies and a reciprocating magnet plate having separate magnets of the present invention which has the above-described configuration, it is possible to be used in both of the linearly or rotationally moving equipment as necessary during achieving the reciprocating movement, and in particular, minimize the loss of the locomotive force by the uniformly arranged coil bodies and the magnets.

In addition, it is possible to instantly cut off the current, and convert and supply the current to the coil bodies by the detection of the sensors within the reciprocating range, and in particular, and due to a prevention of the load during converting the current in the compression of the springs and an increase in the speed by the restoring force, it is also possible to apply the strong reciprocating movement and improve the electric-generating capacities.

DESCRIPTION OF REFERENCE NUMERALS

Figure 1:
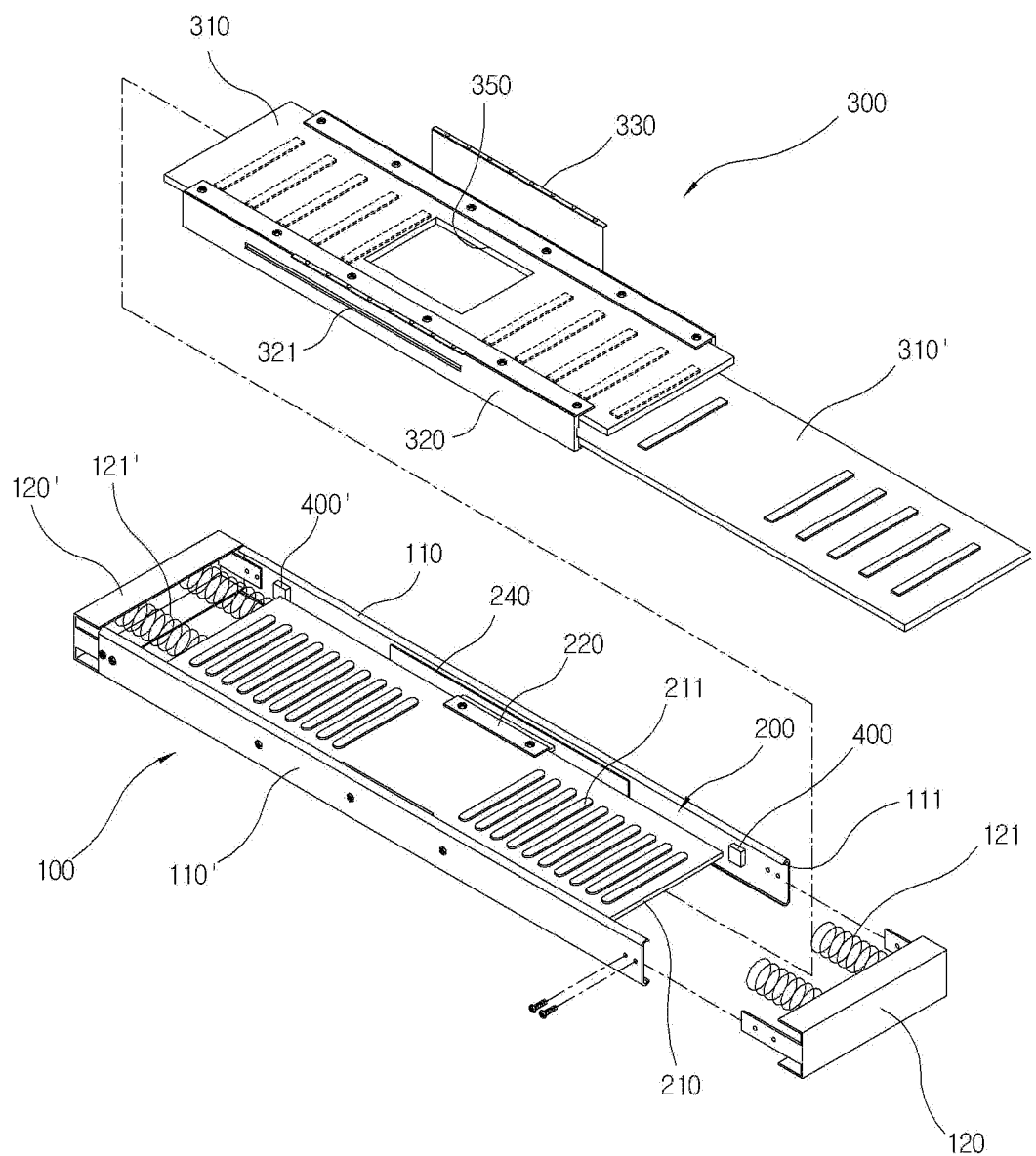
FIG. 1 is a separated perspective view illustrating an electric motor combined with a power generator using a coil plate having separate coil bodies and a reciprocating magnet plate having separate magnets of the present invention.

100: motor body, 110, 110': rail plate
111: guide groove, 120, 120': cover
121, 121': spring
200: fixed plate unit, 210: coil plate
211, 211': coil body, 220: coil plate bracket
230: guide bar, 240: fixing bracket
300: reciprocating plate unit, 310, 310': upper and lower magnet plates
311, 311': magnet, 320: magnet plate bracket
321: guide hole, 330: bearing
350: gear train mounting part, 351, 351': first and second racks
360, 360': first and second clutch gears, 361, 361': outer gear
362, 362': inner gear, 370: shaft gear
400, 400': first and second stop detection sensors, 500, 500': first and second start detection sensors
600: controller, 620: phase convertor
621, 621': phase conversion sensor

BEST MODE

Terms or words used in the specification and claims should not be construed as limited to a conventional or lexical meaning, and should be understood as appropriate notions by the inventor based on that he/she is able to define terms to describe his/her invention in the best way to be seen by others.

Therefore, embodiments and drawings described herein are the most preferable embodiment of the present invention and not exhaustive in terms of the technical idea of the present invention, and it will be understood that various modifications and equivalents may be made to take the place of the embodiments at the application point of the present invention.

Hereinafter, preferable embodiments of the present invention will be described with reference to the accompanying drawings.

Figure 2:
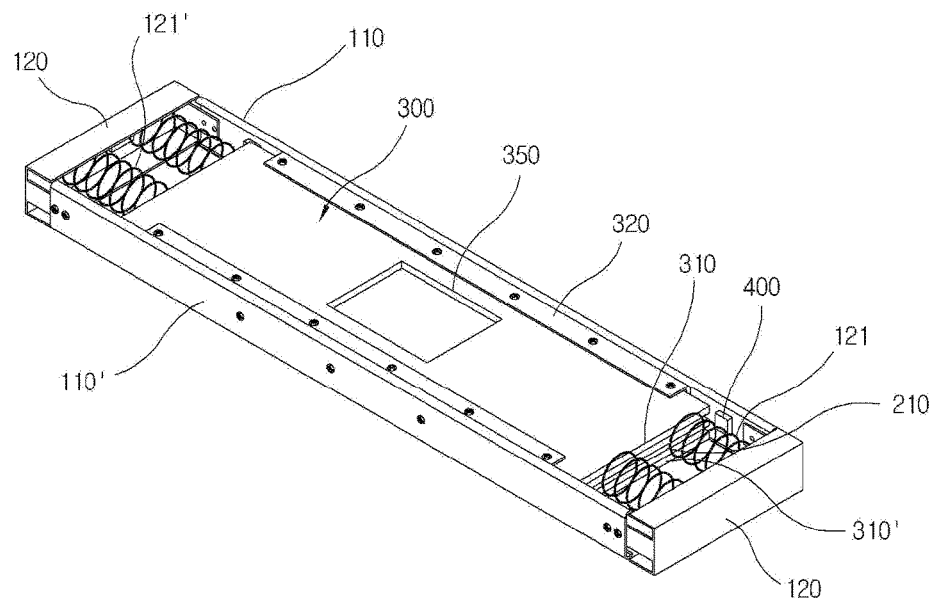
FIG. 2 is an assembled perspective view illustrating the electric motor combined with a power generator using a coil plate having separate coil bodies and a reciprocating magnet plate having separate magnets of the present invention.
Figure 3:
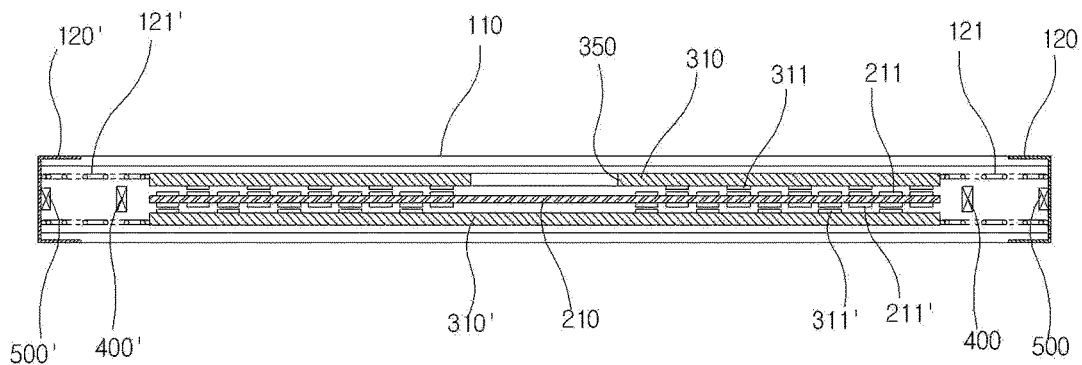
FIG. 3 is a longitudinal sectional view illustrating the electric motor combined with a power generator using a coil plate having separate coil bodies and a reciprocating magnet plate having separate magnets of the present invention.
Figure 4:
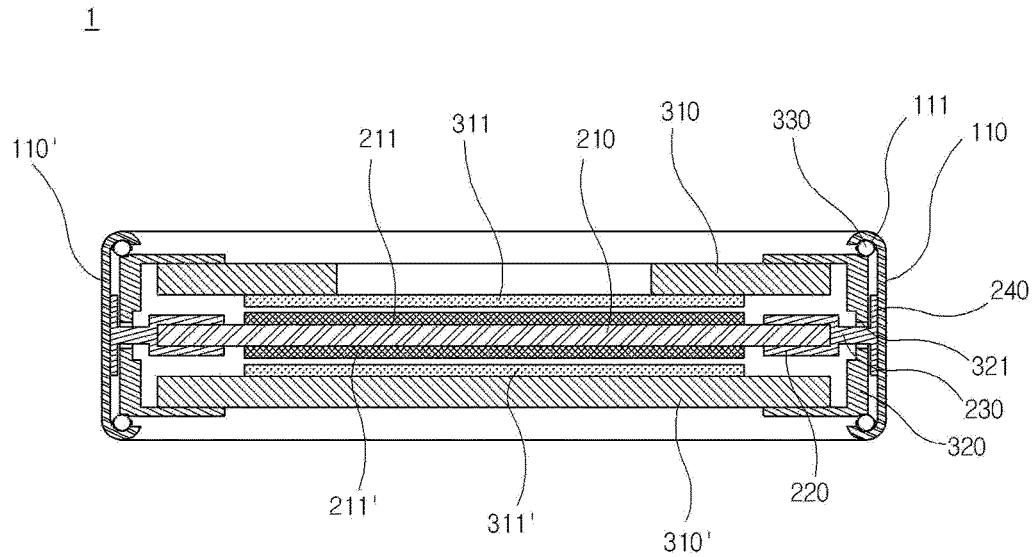
FIG. 4 is a transverse sectional view illustrating the electric motor combined with a power generator using a coil plate having separate coil bodies and a reciprocating magnet plate having separate magnets of the present invention.

FIG. 1 is a separated perspective view illustrating an electric motor combined with a power generator using a coil plate having separate coil bodies and a reciprocating magnet plate having separate magnets of the present invention, FIG. 2 is an assembled perspective view illustrating the electric motor combined with a power generator using a coil plate having separate coil bodies and a reciprocating magnet plate having separate magnets of the present invention, FIG. 3 is a longitudinal sectional view illustrating the electric motor combined with a power generator using a coil plate having separate coil bodies and a reciprocating magnet plate having separate magnets of the present invention, and FIG. 4 is a transverse sectional view illustrating the electric motor combined with a power generator using a coil plate having separate coil bodies and a reciprocating magnet plate having separate magnets of the present invention.

As illustrated in FIGS. 1 to 4, an electric motor combined with a power generator using a coil plate having separate coil bodies and a reciprocating magnet plate having separate magnets 1 of the present invention includes a motor body 100, a fixed plate unit 200, a reciprocating plate unit 300, first and second stop detection sensors 400 and 400', and first and second start detection sensors 500 and 500'.

Herein, the motor body 100 includes rail plates 110 and 110' which are disposed to face each other with a predetermined length, covers 120 and 120' which cover both ends of the rail plates 110 and 110', and is formed in a rectangular shape. The covers 120 and 120' may be coupled to the rail plates 110 and 110' by using conventional bolts, or the like.

In this regard, the rail plates 110 and 110' have guide grooves 111 which are formed by inwardly bending an upper end and a lower end thereof. As described below, the reciprocating plate unit 300 is slidably mounted in the guide grooves 111 of the rail plates.

In addition, the covers 120 and 120' have a pair of two springs 121 and 121' of which one end is seated on an inner surface thereof, respectively. The springs 121 and 121' serve to provide a buffering force and a restoring force during compressing and expanding.

The fixed plate unit 200 has a coil plate 210 which is mounted in such a way that both sides thereof are fixed to the rail plates 110 and 110', and is made of a nonmagnetic material. The coil plate has a plurality of coil bodies 211 and 211' which have flat-shaped horizontal winding coils and are uniformly arranged on upper and lower surfaces thereof in a longitudinal direction.

In this regard, coil plate brackets 220 are fixed to the lateral both ends of the coil plate 210 to hold the coil plate 210, and guide bars 230 extending with a predetermined length are connected to the coil plate brackets 220. Fixing brackets 240 are formed at tips of the guide bars 230 to fix the coil plate 210 to the rail plates 110 and 110'. Accordingly, the coil plate is fixed to the rail plates 110 and 110' through the fixing brackets 240 by using the bolts, or the like.

The reciprocating plate unit 300 disposed in the motor body 100 includes nonmagnetic upper and lower magnet plates 310 and 310' of which both ends contact the springs 121 and 121', and both sides are mounted on the rail plates 110 and 110' so as to slidably reciprocate along the same, with being separately positioned on an upside and a downside of the coil plate 210 at a predetermined interval. The upper and lower magnet plates 310 and 310' have a plurality of magnets 311 and 311' which are uniformly arranged thereon in the longitudinal direction at positions corresponding to the coil bodies 211 and 211' attached on the upper and lower surfaces of the coil plate 210.

Further, in order to maintain the upper and lower magnet plates 310 and 310' with being apart from the coil plate at a predetermined interval, both sides of the upper and lower magnet plates 310 and 310' are connected to magnet plate brackets 320. The magnet plate brackets 320 have guide holes 321 which are formed in a longitudinal long hole shape for inserting the guide bars 230 and allowing the reciprocating plate unit 300 to reciprocate therein without interference.

Leaf bearings 330 are disposed at the upper and lower ends of the magnet plate brackets 320 which are housed in the guide grooves 111 of the rail plates included in the motor body 100, so as to provide rolling contact between the rail plates 110 and 110' and the magnet plate brackets 320. Accordingly, the reciprocating plate unit 300 is mounted on the rail plates so as to reciprocate within the guide grooves through the leaf bearings about the coil plate 210 disposed between the upper and lower magnet plates 310 and 310'.

Figure 5:
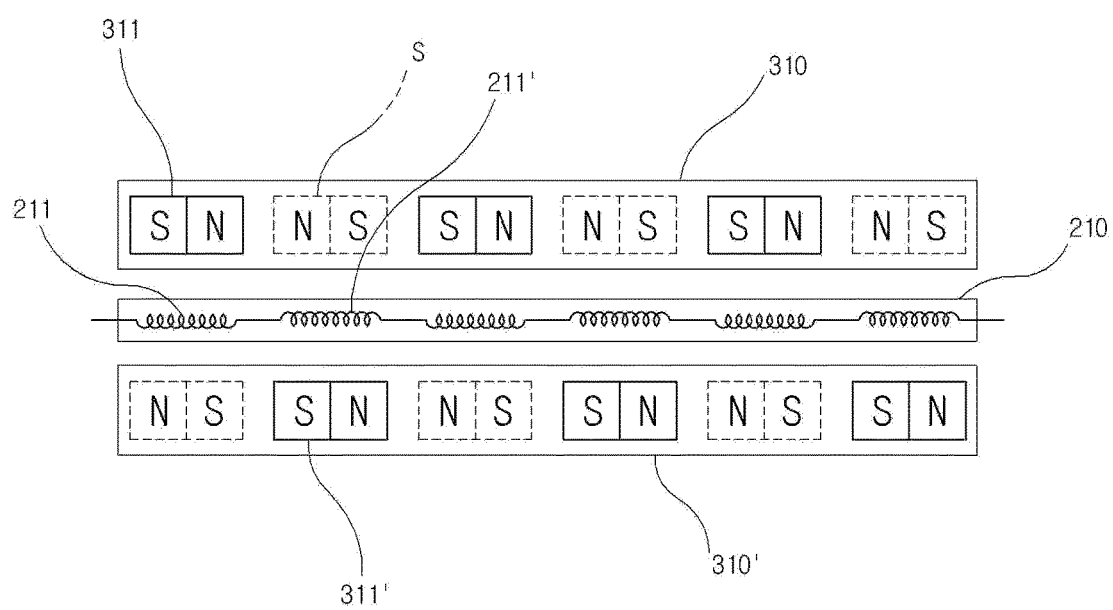
FIG. 5 is a schematic view illustrating an arrangement state of coil bodies and magnets in the electric motor combined with a power generator using a coil plate having separate coil bodies and a reciprocating magnet plate having separate magnets of the present invention.

Meanwhile, as illustrated in FIG. 5, the coil bodies 211 are alternately arranged on the coil plate 210 so that the coils thereof are wound in a different direction from the coils of the coil bodies 211' disposed adjacent thereto.

In addition, the magnets 311 and 311' are alternately disposed one by one in a series with respect to the coil bodies 211 and 211' of the coil plate 210 arranged at the positions corresponding thereto. Herein, the magnets 311 of the upper magnet plate 310 and the magnets 311' of the lower magnet plate 310' are asymmetrically arranged at the positions vertically alternate to each other. Accordingly, virtual magnetism bodies S which are invisible to an eye are formed between the respective magnets 311 and 311' adjacent to each other, and thereby it is possible to maintain a tension relation between the upper and lower magnet plates.

The first and second stop detection sensors 400 and 400' disposed in the motor body 100 are fixed to both inner surfaces of the rail plates 110 and 110' at predetermined positions within a moving range of the reciprocating plate unit 300, so as to detect a tip of the reciprocating plate unit 300 when reaching the predetermined positions.

The first and second start detection sensors 500 and 500' disposed in the motor body 100 are fixed to both inner surfaces of the covers 120 and 120' between the springs 121 and 121', so as to detect the tip of the reciprocating plate unit 300 when reaching tip positions of the rail plates.

Figure 6:
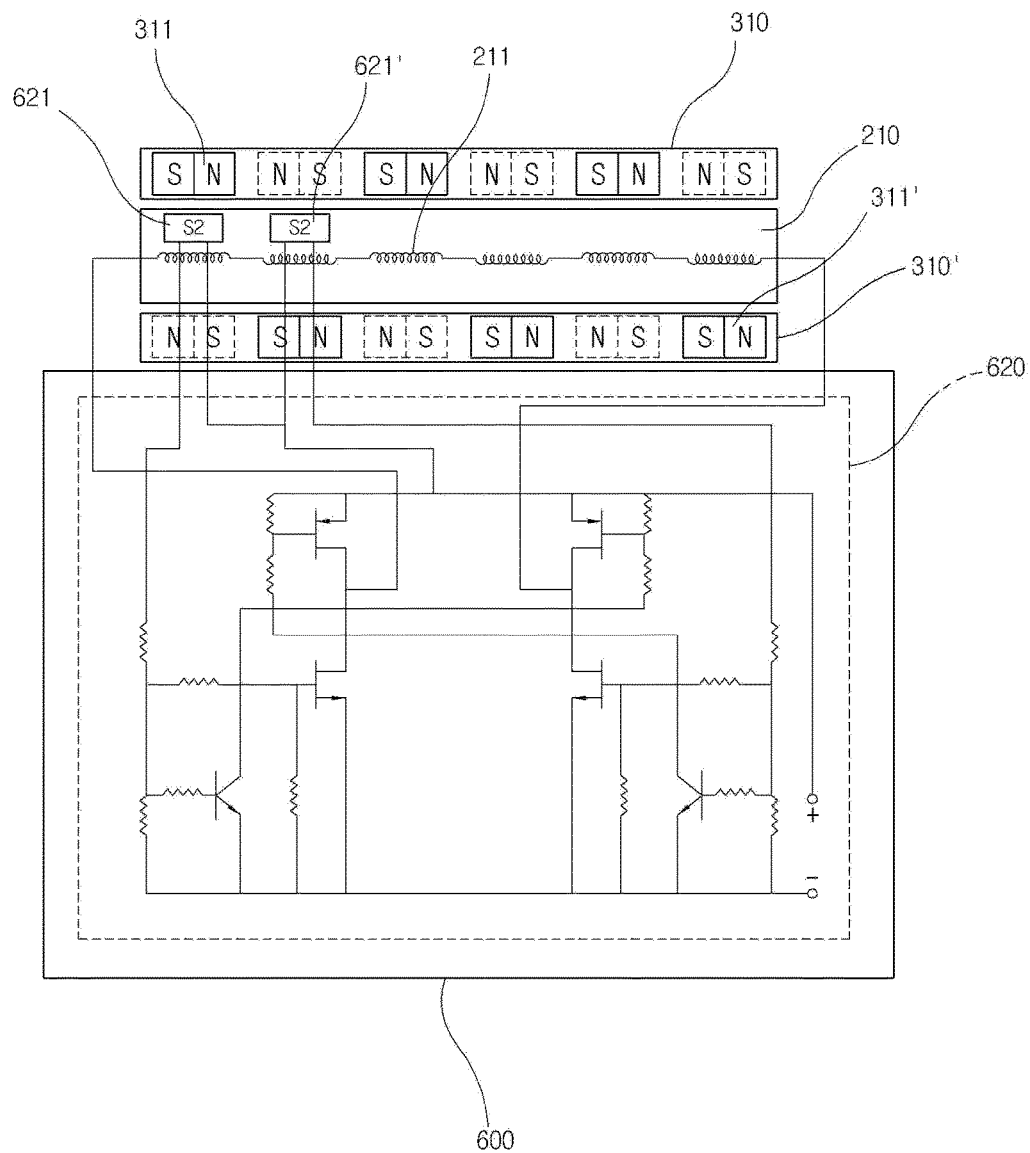
FIG. 6 is a schematic view illustrating a controller of the electric motor combined with a power generator using a coil plate having separate coil bodies and a reciprocating magnet plate having separate magnets of the present invention.

Meanwhile, as illustrated in FIG. 6, the electric motor of the present invention further includes a controller 600 made of a PCB, which is configured to apply a current of a power supply to the coil bodies 211 and 211', cut off the current to the coil bodies corresponding to a present advancing direction of the reciprocating plate unit based on the signal detected and sent from the first and second stop detection sensors 400 and 400', and supply the current to the coil bodies corresponding to the direction opposite to the advancing direction based on the signal detected and sent from the first and second start detection sensors 500 and 500'

In addition, first and second phase conversion sensors 621 and 621' are sequentially disposed on one side of the coil plate 210 at a position of the tip coil body 211 and a position corresponding to the coil body 211' adjacent to the tip coil body 211. The controller 600 further includes a phase convertor 620.

The first and second phase conversion sensors 621 and 621' serve to apply the same phase to the virtual magnetism bodies S formed between the magnets 311 and 311' and the magnets 311 and 311' arranged adjacent thereto.

Figure 7:
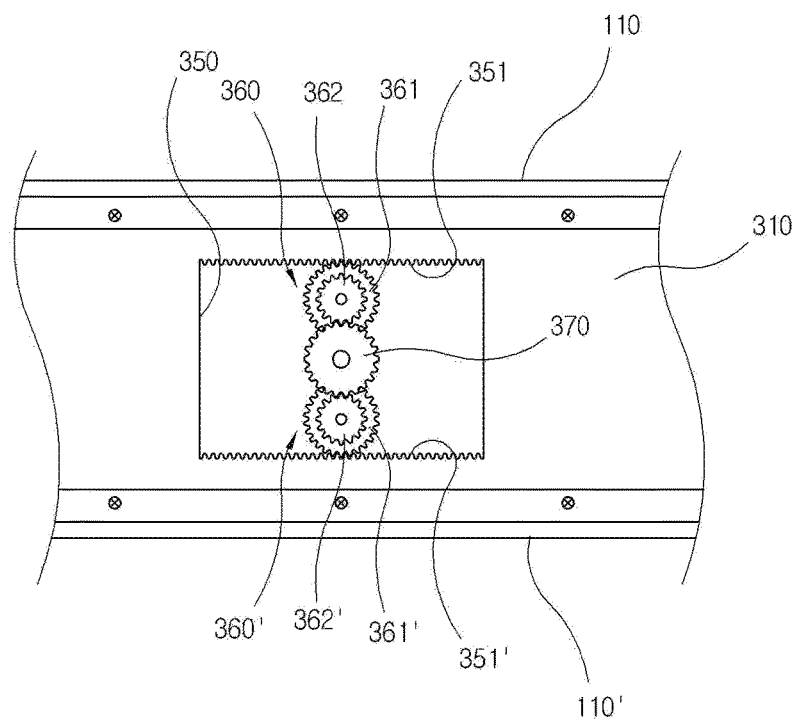
FIG. 7 is a schematic view illustrating another example of the electric motor combined with a power generator using a coil plate having separate coil bodies and a reciprocating magnet plate having separate magnets of the present invention.

Meanwhile, as illustrated in FIG. 7, a gear train mounting part 350 is formed in a rectangular shape at a central portion of any one of the upper and lower magnet plates 310 and 310'. The gear train mounting part 350 includes first and second racks 351 and 351' formed on both inner circumferential surfaces in a longitudinal direction thereof. The first and second racks 351 and 351' are respectively meshed with first and second clutch gears 360 and 360' mounted on the coil plate so as to rotate in only one direction. The respective first and second clutch gears 360 and 360' are meshed with a middle shaft gear 370 mounted on the coil plate.

In this regard, the respective first and second clutch gears 360 and 360' include outer gears 361 and 361' having a larger diameter, and inner gears 362 and 362' having a smaller diameter. The respective outer gears 361 and 361' are meshed with the first and second racks 351 and 351', and the respective inner gears 362 and 362' are meshed with the shaft gear 370.

Hereinafter, an operation of the electric motor combined with a power generator using a coil plate having separate coil bodies and a reciprocating magnet plate having separate magnets, which has the above-described configuration, will be described in detail with reference to the accompanying drawings.

Figure 8:
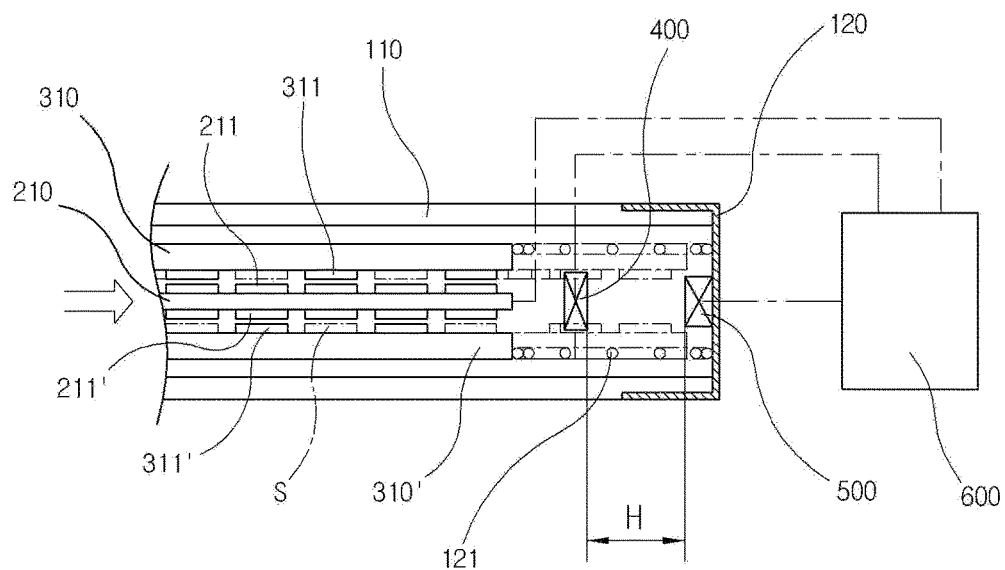
FIG. 8 is a schematic view illustrating a reciprocating and operating state of a reciprocating plate unit in the electric motor combined with a power generator using a coil plate having separate coil bodies and a reciprocating magnet plate having separate magnets of the present invention.

First, as illustrated in FIG. 8, when initially applying a current to the coil bodies 211 and 211' of the coil plate 210 by the controller 600, attractive force/repulsive force and inertia force due to a polarity of charges induced from the coil bodies 211 and 211' and the polarity of the magnets 311 and 311' of the upper and lower magnet plates 310 and 310' are applied to the reciprocating plate unit. Thereby, the reciprocating plate unit 300 moves in one direction along the rail plates 110 and 110'.

During moving the reciprocating plate unit 300 as described, when the tip of the reciprocating plate unit 300 reaches the position of the first stop detection sensors 400, the tip of the reciprocating plate unit 300 is detected by the first stop detection sensor 400. At this time, the signal detected by the first stop detection sensor 400 is sent to the controller 600, thus to cut off the current supplied to the coil bodies corresponding to the advancing direction.

Herein, by cutting off the current as described above, it is possible to prevent a load from occurring due to a change in a current direction when suddenly inverting the direction of the reciprocating plate unit 300.

Meanwhile, as described above, the reciprocating plate unit 300 moving in one direction due to the attractive force/repulsive force and the inertia force contacts the springs 121 to compress the same, and the inertia force thereof is decreased due to a buffering action of the springs in a range H.

Thereafter, the tip of the reciprocating plate unit 300 moving while compressing the springs 121 is detected by the first start detection sensor 500 disposed on the inner surface of the cover 120. The detected signal is sent to the controller 600, and the controller 600 supplies the current to the coil bodies corresponding to the direction opposite to the advancing direction.

That is, by applying the current having an opposite polarity to that of the initial start to the coil bodies 211 and 211', and acting the attractive force/repulsive force and the inertia force due to the polarity of the charges induced from the coil bodies 211 and 211' and the polarity of the magnets 311 and 311' of the upper and lower magnet plates 310 and 310', the reciprocating plate unit 300 can move in the direction opposite to the advancing direction. In the direction opposite to the advancing direction, operation of detecting and converting the moving direction of the reciprocating plate unit is performed by the controller based on the signals detected and sent by the second stop detection sensor 400' and the second start detection sensor 500', and such a reciprocating movement is repeated.

Figure 9:
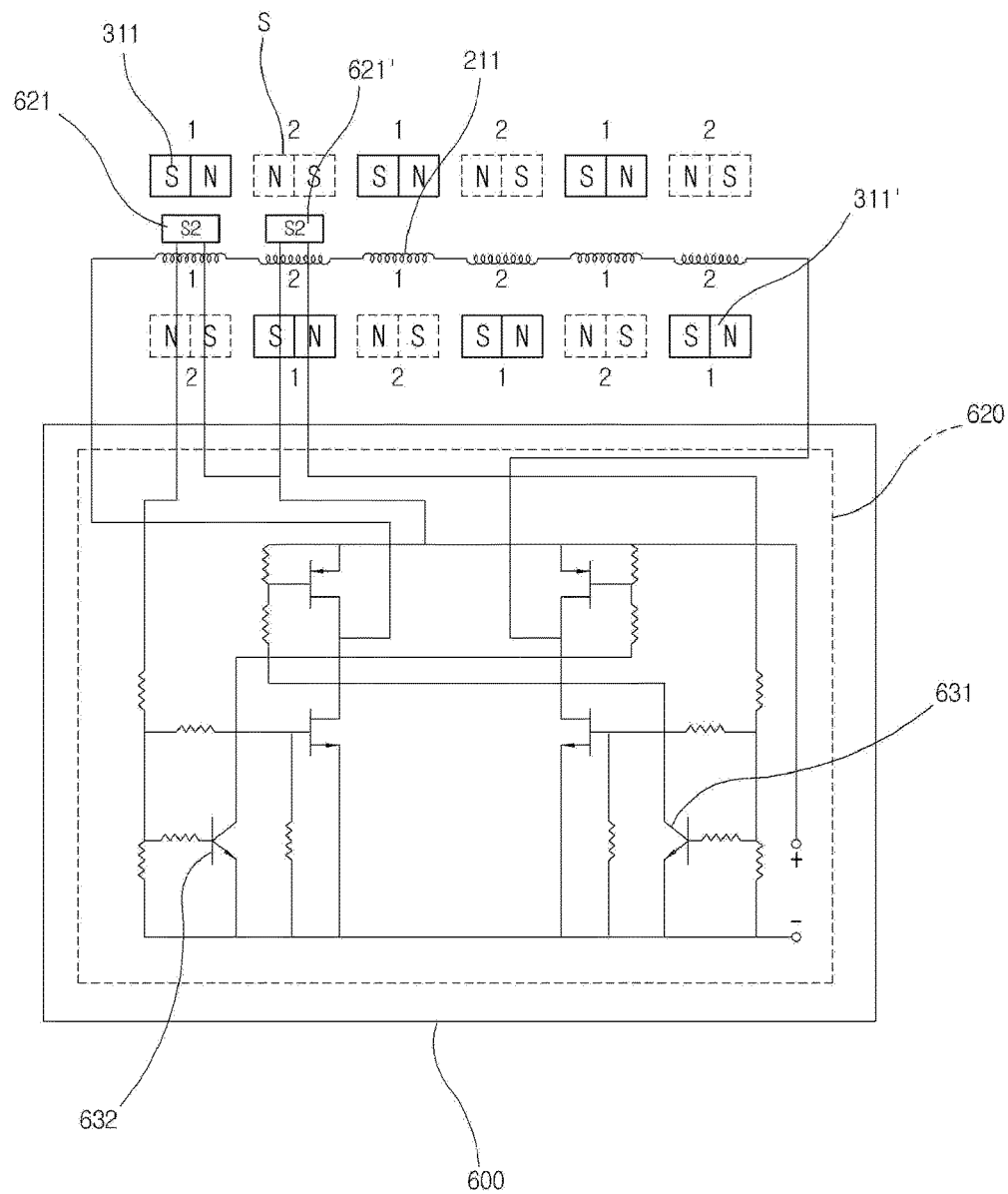
FIG. 9 is a schematic view illustrating a phase converting state in the electric motor combined with a power generator using a coil plate having separate coil bodies and a reciprocating magnet plate having separate magnets of the present invention.

Herein, as illustrated in FIG. 9, when reciprocating the reciprocating plate unit 300, the inertia force is applied thereto by the magnets mounted on the both surfaces of the coil bodies 211 and 211'. In addition, by maintaining the tension relation between the upper and lower magnet plates using the side portions of the magnets, another virtual magnetism bodies S occurs. By asymmetrically arranging the magnets 311 of the upper magnet plate 310 and the magnets 311' of the lower magnet plate 310' from each other, effects of offsetting an excessive attractive force, electronic and physical matching, and a reduction in magnetic materials may be obtained.

When applying DC to the coil bodies 211 and 211', the repulsive force occurs between the magnets. In order to apply the same phase of the coil repulsive force between the magnets 311 and 311' and the virtual magnetism bodies S based on the Fleming's right-hand rule, the coils of the coil bodies 211 and 211' are wound in the different direction from each other. That is, when the magnets 311 and 311' reach the position of coil 2, a change in the phase for providing the repulsive force of the same direction is required The phase convertor 620 may be implemented by a circuit including a field-effect transistor (FET) device.

That is, for switching + and − phases, first, the actual magnets are detected by the first phase conversion sensor 621 formed on the coil plate 210, and a + current is output to generate a + electrode on the FFT-1631 side. Then, when moving the magnets to reach the next second phase conversion sensor 621', the + current is output, and the FFT-1631 side is converted into the positive polarity, and constant potential corresponding to the conversion of the magnets is supplied to the coil side, such that the repulsive force occurs in a constant direction to generate a moving force.

Herein, when changing the output of the first and second phase conversion sensors 621 and 621', the moving direction of the reciprocating plate unit 300 is converted into 180 degrees. At this time, by the Fleming's right-hand rule, the moving direction of the reciprocating plate unit can be changed by a change in the current flow of about 1 mA, such that a control function of the speed and direction conversion of the reciprocating plate unit may be easily performed.

Meanwhile, the electric motor of the present invention executing the above-described operation performs a basic linear reciprocating movement. By converting the linear movement into the rotational movement, it is possible to rotate and drive a crankshaft 700.

Figure 10:
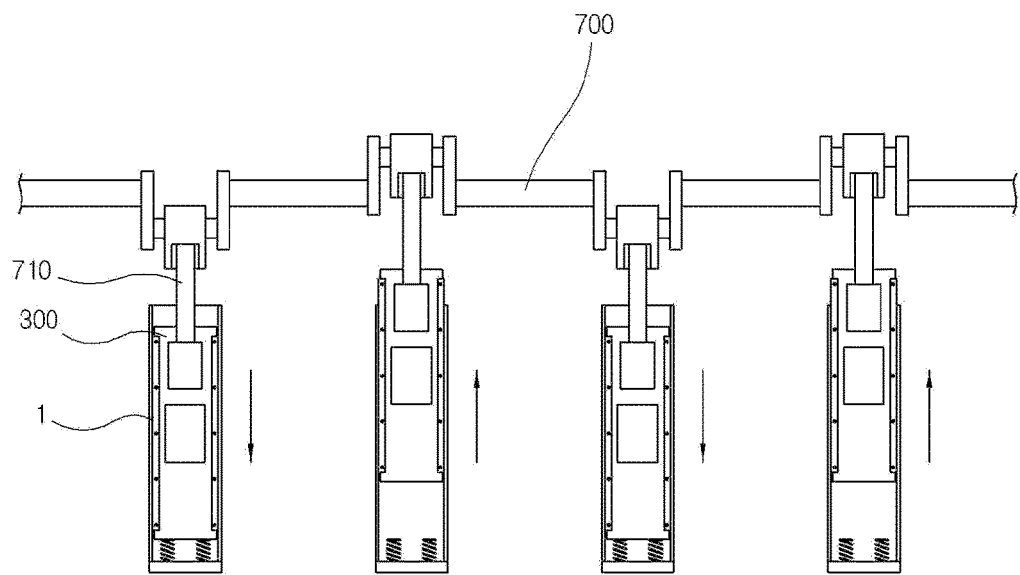
FIG. 10 is a view illustrating an example in which the electric motor combined with a power generator using a coil plate having separate coil bodies and a reciprocating magnet plate having separate magnets of the present invention is applied to a linearly moving equipment.

That is, as illustrated in FIG. 10, when a connecting rod 710 connected to the crankshaft 700 is coupled to the reciprocating plate unit 300 of the electric motor 1, it is possible to use it as an electric motor. By the reciprocating movement of the electric motor 1, the connecting rod 710 may be linear reciprocated, and thus apply the rotational force to the crankshaft 700.

At this time, while removing one cover 120' for covering the rail plates 110 and 110' of the motor body 100 in the electric motor 1 according to the present invention, the reciprocating plate unit and the connecting rod are coupled to each other to be used. In this case, the reciprocating length of the reciprocating plate unit 300 may be extended.

In addition, rotational driving may be obtained by using the first and second clutch gears 360 and 360' according to the embodiment of the present invention.

Figure 11:
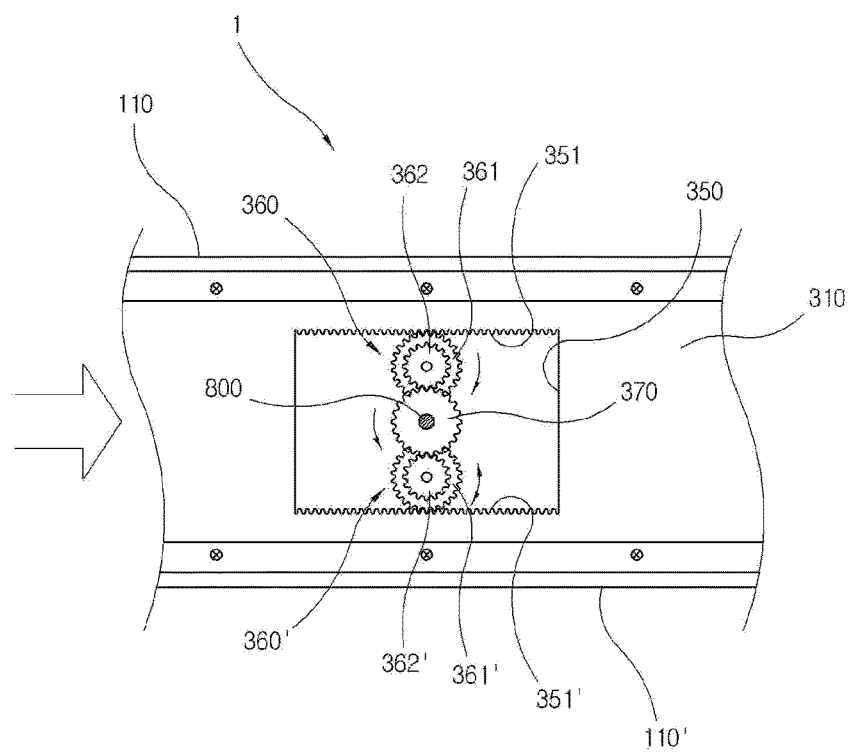
FIG. 11 is a view illustrating an example in which the electric motor combined with a power generator using a coil plate having separate coil bodies and a reciprocating magnet plate having separate magnets of the present invention is applied to a rotationally moving equipment.

That is, as illustrated in FIG. 11, in the embodiment in which a rotor shaft 800 is mounted on the shaft gear 370, when reciprocating the reciprocating plate unit 300, if the rotational force is transmitted to the first clutch gear 360 meshed with the first rack 351 according to a movement in one direction, the rotational force is transmitted to the shaft gear 370 meshed with the inner gear 362 of the first clutch gear 360 to rotate the shaft gear 370 in a direction opposite to the one direction, thus to rotate and drive the rotor shaft 800. At this time, even if the rotational force is transmitted to the inner gear 362' of the second clutch gear 360', the outer gear 361' configured to rotate in only one direction idles, and the reciprocating plate unit 300 may move without interruption.

When moving the reciprocating plate unit 300 in the direction opposite to the above-described direction, if the rotational force is transmitted to the second clutch gear 360' meshed with the second rack 351', the rotational force is transmitted to the shaft gear 370 meshed with the inner gear 362' of the second clutch gear 360' to rotate the shaft gear in the opposite direction, thus to rotate and drive the rotor shaft 800. At this time, the first clutch gear 360 idles, and the reciprocating plate unit 300 may move without interruption.

Meanwhile, the electric motor 1 according to the present invention may be used as a generator. That is, after the coil bodies 211 and 211' are branched off and connected to a separate transformer (not illustrated), the electric motor may be used for charging a separate storage battery (not illustrated).

Specifically, when mounting the electric motor in the linearly or rotationally moving equipment, and reciprocating the reciprocating plate unit 300, the coil bodies 211 and 211' generate electricity. The generated electricity is converted into AC through the transformer, and the converted AC is stored in the separate provide storage battery. Therefore, the electric motor according to the present invention may be also performed as a role of the generator.

When the charging to the storage battery ends by performing the role of the generator as described above, it is possible to use the AC of the storage battery as a power of the equipment. Therefore, it is possible to effectively use the energy.

As described above, the electric motor combined with a power generator using a coil plate having separate coil bodies and a reciprocating magnet plate having separate magnets can produce a linear reciprocating movement due to the repulsive force and the inertia force, and can be variously applied to the linearly or rotationally moving equipment, and thereby having a wide range of applications.

The invention claimed is:

1. An electric motor combined with a power generator using a coil plate having separate coil bodies and a reciprocating magnet plate having separate magnets to provide electric-generating capacities due to repulsive force while inducing a horizontal cross magnetism between the coil plate and the magnet plate, the electric motor comprising:
   a vertically opened motor body 100 including rail plates 110 and 110' disposed so as to face each other on both sides in a longitudinal direction thereof, and covers 120 and 120' which cover both ends of the rail plates 110 and 110' and have springs 121 and 121' respectively disposed therein;
   a fixed plate unit 200 including a coil plate 210 of which both sides are fixed to the rail plates 110 and 110' in the motor body 100, and a plurality of coil bodies 211 and 211' are uniformly arranged on an upper surface and a lower surface thereof;
   a reciprocating plate unit 300 including upper and lower magnet plates 310 and 310' which are slidably mounted in the motor body 100 with being separately positioned on an upside and a downside of the coil plate 210 at a predetermined interval, and have a plurality of upper and lower magnet plates 310 and 310' arranged on both surfaces thereof at positions corresponding to the coil plate 210;
   first and second stop detection sensors 400 and 400' which are disposed on both sides of at least one rail plate 110 in the motor body 100, and are configured to detect the reciprocating plate unit 300 when reaching a predetermined position; and
   first and second start detection sensors 500 and 500' which are respectively mounted on an inner surface of the covers 120 and 120' in the motor body 100, and are configured to detect the reciprocating plate unit 300 when reaching a tip position of the rail plate.

2. The electric motor according to claim 1, wherein the rail plates 110 and 110' of the motor body 100 have guide grooves 111 which are formed by inwardly bending an upper end and a lower end thereof,
   the fixed plate unit 200 includes coil plate brackets 220 which are fixed to lateral both ends of the coil plate 210 to hold the coil plate 210, guide bars 230 extending from the coil plate brackets 220, and fixing brackets 240 which are connected to the guide bars 230 to fix the lateral both ends of the coil plate 210 to the rail plates 110 and 110', and
   the reciprocating plate unit 300 includes magnet plate brackets 320 which are configured to maintain the upper and lower magnet plates 310 and 310' with being apart from the coil plate at a predetermined interval, and have long hole-shaped guide holes 321 which are formed in both sides thereof to insert the guide bars 230 for allowing the same to reciprocate therein without interference, and leaf bearings 330 which are disposed at the upper and lower ends of the magnet plate brackets 320, and are housed in the guide grooves 111 of the motor body 100, so as to provide rolling contact between the rail plates 110 and 110' and the magnet plate brackets 320.

3. The electric motor according to claim 1, wherein the coil bodies 211 and 211' arranged on the upper and lower surfaces of the coil plate 210 are alternately formed, so that the coils of the coil bodies 211 are wound in a different direction from the coils of the coil bodies 211' disposed adjacent thereto.

4. The electric motor according to claim 1, wherein the magnets 311 and 311' arranged on upper and lower surfaces of the upper and lower magnet plates 310 and 310' are alternately formed one by one in a series with respect to the coil bodies 211 and 211' of the coil plate 210 arranged at the positions corresponding thereto.

5. The electric motor according to claim 1, further comprises a controller 600 which is configured to apply a current of a power supply to the coil bodies 211 and 211', cut off the current to the coil bodies corresponding to an advancing direction of the reciprocating plate unit based on a signal detected and sent from the first and second stop detection sensors 400 and 400', and supply the current to the coil bodies corresponding to the direction opposite to the advancing direction based on the signal detected and sent from the first and second start detection sensors 500 and 500'.

6. The electric motor according to claim 1, wherein the magnets 311 and 311' arranged on the upper and lower magnet plates 310 and 310' are disposed so that the magnets 311 of the upper magnet plate 310 and the magnets 311' of the lower magnet plate 310' are asymmetrically arranged at the positions vertically alternate to each other.

7. The electric motor according to claim 6, wherein first and second phase conversion sensors 621 and 621' are sequentially disposed on one side of the coil plate 210 at a position of a tip coil body 211 and a position corresponding to the coil body 211' adjacent to the tip coil body 211, controller 600 further includes a phase convertor 620, and the first and second phase conversion sensors 621 and 621' are configured so as to form same phase between the magnets 311 and 311' arranged adjacent thereto.

8. The electric motor according to claim 1, wherein first and second phase conversion sensors 621 and 621' are sequentially disposed on one side of the coil plate 210 at a position of a tip coil body 211 and a position corresponding to the coil body 211' adjacent to the tip coil body 211, controller 600 further includes a phase convertor 620, and the first and second phase conversion sensors 621 and 621' are configured so as to form same phase between the magnets 311 and 311' arranged adjacent thereto.

9. The electric motor according to claim 1, further comprises a gear train mounting part 350 which is formed in a rectangular shape at a central portion of any one of the upper and lower magnet plates 310 and 310', wherein the gear train mounting part 350 includes first and second racks 351 and 351' formed on both inner circumferential surfaces in a longitudinal direction thereof, and the first and second racks 351 and 351' are respectively meshed with first and second clutch gears 360 and 360' mounted on the coil plate so as to rotate in only one direction, and the respective first and second clutch gears 360 and 360' are meshed with a shaft gear 370 mounted on the coil plate, and the respective first and second clutch gears 360 and 360' include outer gears 361 and 361' having a larger diameter, and inner gears 362 and 362' having a smaller diameter, and are configured to mesh with the first and second racks 351 and 351' through the respective outer gears 361 and 361', and mesh with the shaft gear 370 through the respective inner gears 362 and 362'.

* * * * *